(12) United States Patent
Mabe et al.

(10) Patent No.: US 11,725,137 B2
(45) Date of Patent: Aug. 15, 2023

(54) DEFECT-RESISTANT PLASTIC SCINTILLATORS WITH ALIPHATIC ADDITIVES

(71) Applicants: Lawrence Livermore National Security, LLC, Livermore, CA (US); Ludlum Measurements, Inc., Sweetwater, TX (US); National Technology & Engineering Solutions of Sandia, LLC, Albuquerque, NM (US)

(72) Inventors: Andrew Neil Mabe, Livermore, CA (US); M Leslie Carman, San Ramon, CA (US); Stephen Anthony Payne, Castro Valley, CA (US); Natalia P. Zaitseva, Livermore, CA (US); Charles R. Hurlbut, Sweetwater, TX (US); Terence C. O'Brien, Sweetwater, TX (US); Kyle Ray Shipp, Sweetwater, TX (US); Nicholas Richard Myllenbeck, Livermore, CA (US)

(73) Assignees: Lawrence Livermore National Security, LLC, Livermore, CA (US); Ludlum Measurements, Inc., Sweetwater, TX (US); National Technology & Engineering Solutions of Sandia, LLC, Albuquerque, NM (US)

( * ) Notice: Subject to any disclaimer, the term of this patent is extended or adjusted under 35 U.S.C. 154(b) by 49 days.

(21) Appl. No.: 17/244,805

(22) Filed: Apr. 29, 2021

(65) Prior Publication Data
US 2021/0340437 A1    Nov. 4, 2021

Related U.S. Application Data

(60) Provisional application No. 63/018,975, filed on May 1, 2020.

(51) Int. Cl.
*C09K 11/02* (2006.01)
*C09K 11/06* (2006.01)
(Continued)

(52) U.S. Cl.
CPC .............. *C09K 11/02* (2013.01); *C08J 3/20* (2013.01); *C08K 5/353* (2013.01); *C09K 11/06* (2013.01); *G01T 1/2033* (2013.01); *C09K 2211/1007* (2013.01); *C09K 2211/1018* (2013.01)

(58) Field of Classification Search
CPC ............ C09K 11/02; C09K 2211/1007; C09K 2211/1018; G01T 1/2033; C01J 3/20
See application file for complete search history.

(56) References Cited

U.S. PATENT DOCUMENTS 10,647,914 B2 *   5/2020   Zaitseva .............. C09K 11/025
10,732,304 B1     8/2020   Myllenbeck et al.
(Continued)

FOREIGN PATENT DOCUMENTS

GB     2106525     *   4/1983
WO   2012044379 A2     4/2012

OTHER PUBLICATIONS

International Search Report and Written Opinion from PCT Application No. PCT/US2021/030159, dated Oct. 19, 2021.
(Continued)

*Primary Examiner* — C Melissa Koslow
(74) *Attorney, Agent, or Firm* — Zilka-Kotab, P.C.

(57) ABSTRACT

A plastic scintillator includes a polymer matrix, an aliphatic additive present in the polymer matrix in an effective amount to impart fog resistance to the plastic scintillator, and at least one fluorescent dye in the polymer matrix, the dye being effective to provide scintillation upon exposure to radiation. The effective amount of the aliphatic additive is in a range of greater than 0 weight percent up to 5 weight percent
(Continued)

relative to the total weight of the plastic scintillator. Moreover, the aliphatic additive has a structure comprising up to 300 repeat units.

24 Claims, 9 Drawing Sheets

(51) Int. Cl.
  *C08K 5/353* (2006.01)
  *C08J 3/20* (2006.01)
  *G01T 1/203* (2006.01)

(56) References Cited

U.S. PATENT DOCUMENTS

| | | | |
|---|---|---|---|
| 2004/0104500 | A1 | 6/2004 | Bross et al. |
| 2005/0113536 | A1 | 5/2005 | Armstrong et al. |
| 2014/0332689 | A1 | 11/2014 | Van Loef et al. |
| 2015/0028217 | A1* | 1/2015 | Zaitseva ............ G21K 4/00 250/361 R |
| 2016/0017220 | A1 | 1/2016 | Hamel et al. |
| 2016/0102247 | A1 | 4/2016 | Cherepy et al. |
| 2018/0265775 | A1* | 9/2018 | Zaitseva ............ C09K 11/06 |
| 2020/0224087 | A1 | 7/2020 | Zaitseva et al. |

OTHER PUBLICATIONS

Loyd et al., "Effects of temporary fogging and defogging in plastic scintillators," Nuclear Instruments and Methods in Physics Research Section A: Accelerators, Spectrometers, Detectors and Associated Equipment, vol. 922, 2019, pp. 202-208.

Kouzes et al., "Investigations of degradation and encapsulation of plastic scintillator," Nuclear Instruments and Methods in Physics Research, A, vol. 954, 2020, pp. 13 pages.

Wikipedia, "Small molecule," Wikipedia, 2021, 4 pages, retrieved from https://en.wikipedia.org/wiki/Small_molecule#:~:text=Within% 20the%20fields%20of%20molecular,Many%20drugs%20are% 20small%20molecules.

Zaitseva et al., U.S. Appl. No. 15/462,512, filed Mar. 17, 2017.

Non-Final Office Action from U.S. Appl. No. 15/462,512, dated Apr. 15, 2019.

Final Office Action from U.S. Appl. No. 15/462,512, dated Aug. 13, 2019.

Notice of Allowance from U.S. Appl. No. 15/462,512, dated Dec. 20, 2020.

Cameron et al. "Fogging in Polyvinyl Toluene Scintillators," IEEE Transactions on Nuclear Science, vol. 62, No. 1, 2015, pp. 368-371.

Bagan et al, "Crosslinked plastic scintillators: A new detection system for radioactive measurement in organic and aggressive media," Analytica Chimica Acta 852, Oct. 18, 2014, pp. 13-19.

Zaitseva et al., U.S. Appl. No. 16/825,926, filed Mar. 20, 2020.

Non-Final Office Action from U.S. Appl. No. 16/825,926, dated Sep. 28, 2020.

Final Office Action from U.S. Appl. No. 16/825,926, dated Jan. 29, 2021.

Advisory Action from U.S. Appl. No. 16/825,926, dated Apr. 2, 2021.

International Preliminary Examination Report from PCT Application No. PCT/US2021/030159, dated Oct. 27, 2022.

\* cited by examiner

PEG-(OH)₂

PEG-(OMe)(OH)

PPG-(OH)₂

DEFECT-RESISTANT PLASTIC SCINTILLATORS WITH ALIPHATIC ADDITIVES

RELATED APPLICATIONS

This application claims priority to U.S. Provisional Patent Application No. 63/018,975 filed May 1, 2020, which is herein incorporated by reference.

This invention was made with Government support under Contract No. DE-AC52-07NA27344 awarded by the United States Department of Energy. The Government has certain rights in the invention.

FIELD OF THE INVENTION

The present invention relates to plastic scintillators for detecting radiation, and more particularly, this invention relates to material compositions for constructing plastic scintillators that exhibit reduced fogging and optical defects following exposure to environmental conditions such as temperature and/or humidity variation.

BACKGROUND

Plastic scintillators are essential elements of many radiation detectors. Conventional plastic scintillators generally comprise a bulk plastic material that is preferably transparent to ultraviolet or visible light generated by incident ionizing radiation of types to be detected using the scintillator device. The most common of such materials include polystyrene (PS) and polyvinyltoluene (PVT) doped with fluorescent dyes owing to the well-known and desirable optical properties of such materials in the context of use in a scintillation radiation detector.

In the presence of normal temperatures and humidity fluctuations in standard operating environments, water vapor is absorbed in the plastic scintillators. Moreover, in the presence of humidity, water absorbed in the plastic scintillators, when cooled, e.g., temperature is reduced, condenses and forms scattering centers in the plastic, e.g., produces fogging. After warming the plastic, the fogging may or may not disappear.

Environmental cycling has been described as thermal cycling of the plastic scintillator through normal environmental temperature variations. Over time, the scattering centers formed by the water in the plastic results in optical defects within the volume of the scintillator. The fogging defects tend to grow to a larger size and become permanent defects that do not disappear under typical operating conditions. Fogging and optical defects can reduce the optical transparency of the materials used to construct the plastic scintillator, which thereby reduces the overall light collection and detection efficiency of the scintillator.

Environmental cycling can lead to temporary and permanent optical defects in the scintillator. The reduction in detection efficiency can lead to a reduction in the service life of a scintillator thereby requiring more frequent replacement of the scintillator. Additionally, environmental protection may be required thereby increasing the cost and complexity of a radiation detection system.

Attempts have been made to reduce exposure of plastic scintillators to moisture by applying a layer of encapsulating material to the plastic scintillator. The encapsulating material having a low moisture transfer rate may prevent water vapor from being absorbed by the scintillator. However, such encapsulation techniques have shown the formation of small defects in the encapsulating layer, such as pinholes, that can allow moisture to enter the scintillator and cause fogging and optical defect formation.

Accordingly, it would be useful to provide a scintillator construction that minimizes or eliminates occurrence of fogging and optical defects caused by environmental conditions.

SUMMARY

In one aspect of the invention, a plastic scintillator includes a polymer matrix, an aliphatic additive present in the polymer matrix in an effective amount to impart fog resistance to the plastic scintillator, and at least one fluorescent dye in the polymer matrix, the dye being effective to provide scintillation upon exposure to radiation. The effective amount of the aliphatic additive is in a range of greater than 0 weight percent up to 5 weight percent relative to the total weight of the plastic scintillator. Moreover, the aliphatic additive has a structure comprising up to 300 repeat units.

In another aspect of the invention, a plastic scintillator includes a polymer matrix, an aliphatic additive present in the polymer matrix in an effective amount to impart fog resistance to the plastic scintillator where the fog resistance is defined as the plastic scintillator being essentially free of fog following a water vapor treatment, and at least one fluorescent dye in the polymer matrix. The dye is effective to provide scintillation upon exposure to radiation. The water vapor treatment includes heating of the plastic scintillator to 55° C. in the presence of water vapor in a range of 70 to 100% relative humidity for one week followed by cooling the plastic scintillator to 25° C.

In yet another aspect of the invention, a method of forming a plastic scintillator includes creating a homogenous mixture of precursor components including at least one monomeric species having a phenyl group for polymerization, an aliphatic additive present in an effective amount to impart fog resistance to the plastic scintillator, and at least one fluorescent dye effective to provide scintillation upon exposure to radiation. In addition, the method includes polymerizing the homogenous mixture. The fog resistance is defined as the plastic scintillator being essentially free of fog following a water vapor treatment comprising a heating of the plastic scintillator to 55° C. in the presence of water vapor in a range of 70 to 100% relative humidity for one week followed by cooling the plastic scintillator to 25° C.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

Figure 1A:
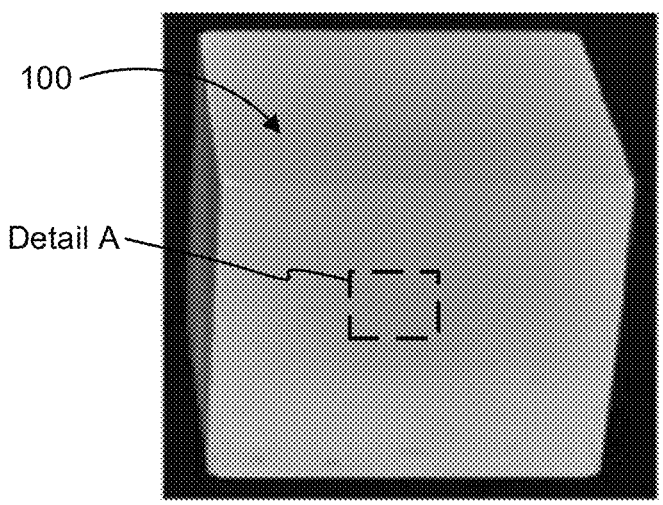
FIG. 1A is a photographic image of an exemplary conventional plastic scintillator after a first cooling cycle during thermal treatment in a humid atmosphere.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

For the purposes of this application, room temperature is defined as in a range of about 20° C. to about 25° C.

As also used herein, the term "about" denotes an interval of accuracy that ensures the technical effect of the feature in question. In various approaches, the term "about" when combined with a value, refers to plus and minus 10% of the reference value. For example, a thickness of about 10 nm refers to a thickness of 10 nm±1 nm, a temperature of about 50° C. refers to a temperature of 50° C.±5° C., etc.

It is also noted that, as used in the specification and the appended claims, wt % is defined as the percentage of weight of a particular component is to the total weight/mass of the mixture. Vol % is defined as the percentage of volume of a particular compound to the total volume of the mixture or compound. Mol % is defined as the percentage of moles of a particular component to the total moles of the mixture or compound. Atomic % (at %) is defined as a percentage of one type of atom relative to the total number of atoms of the mixture or compound.

Unless expressly defined otherwise herein, each component listed in a particular approach may be present in an effective amount. An effective amount of a component means that enough of the component is present to result in a discernable change in a target characteristic of a mixture, and/or final product in which the component is present, and preferably results in a change of the characteristic to within a desired range. One skilled in the art, now armed with the teachings herein, would be able to readily determine an effective amount of a particular component without having to resort to undue experimentation.

The following descriptions refer to "plastics," "optics," "detector materials," "detector compositions," "scintillators," etc. interchangeably. All such recitations shall be understood as referring to a material comprising one or more polymers and one or more fluors arranged in a manner so as to convey the ability to detect radiation of interest (e.g., gamma radiation) incident on the material. In general, such detection is accomplished via scintillation, in which a photon having a wavelength of interest is absorbed and another photon (having the same wavelength or perhaps a shifted wavelength, depending on fluor) is subsequently emitted by the detector material.

The following description discloses several preferred embodiments of plastic scintillation radiation detectors, and more particularly, this invention relates to compositions of plastic scintillation radiation detectors that resist or prevent fogging and/or formation of optical defects during/following exposure to environmental conditions.

In one general aspect of the invention, a plastic scintillator includes a polymer matrix, an aliphatic additive present in the polymer matrix in an effective amount to impart fog resistance to the plastic scintillator, and at least one fluorescent dye in the polymer matrix, the dye being effective to provide scintillation upon exposure to radiation. The effective amount of the aliphatic additive is in a range of greater than 0 weight percent up to 5 weight percent relative to the total weight of the plastic scintillator. Moreover, the aliphatic additive has a structure comprising up to 300 repeat units.

In another general aspect of the invention, a plastic scintillator includes a polymer matrix, an aliphatic additive present in the polymer matrix in an effective amount to impart fog resistance to the plastic scintillator where the fog resistance is defined as the plastic scintillator being essentially free of fog following a water vapor treatment, and at least one fluorescent dye in the polymer matrix. The dye is effective to provide scintillation upon exposure to radiation. The water vapor treatment includes heating of the plastic scintillator to 55° C. in the presence of water vapor in a range of 70 to 100% relative humidity for one week followed by cooling the plastic scintillator to 25° C.

In yet another general aspect of the invention, a method of forming a plastic scintillator includes creating a homogenous mixture of precursor components including at least one monomeric species having a phenyl group for polymerization, an aliphatic additive present in an effective amount to impart fog resistance to the plastic scintillator, and at least one fluorescent dye effective to provide scintillation upon exposure to radiation. In addition, the method includes polymerizing the homogenous mixture. The fog resistance is defined as the plastic scintillator being essentially free of fog following a water vapor treatment comprising a heating of the plastic scintillator to 55° C. in the presence of water vapor in a range of 70 to 100% relative humidity for one week followed by cooling the plastic scintillator to 25° C.

A list of acronyms used in the description is provided below.

| | |
|---|---|
| 3D | three-dimensional |
| C. | Celsius |
| EO | ethylene oxide |
| Me | methyl |
| nm | nanometer |
| PEG | polyethylene glycol |
| PPG | polypropylene glycol |
| PO | propylene oxide |
| PS | polystyrene |
| PVT | polyvinyl toluene |
| RH | relative humidity |
| RT | room temperature |
| μm | micron |
| wt % | weight percent |

In accordance with an aspect of the invention, plastic scintillators, and compositions used to construct the plastic scintillators, can be constructed with aliphatic additives for reducing or eliminating fogging and optical defects resulting from environmental cycling. The scintillators can be used to detect radioactive materials, such as nuclear and radiological materials, to identify special nuclear materials, and as radiation portal monitors. The scintillators can be configured for outdoor use and/or for use in humid environments. The scintillators are constructed to be environmentally stable. The scintillators are constructed from optical polymers that reduce or prevent plastic degradation and defects.

In some examples, standard plastic scintillators used in environmental conditions comprise PVT and small quantities (<2%) of fluorescent dyes. In the presence of normal temperature and humidity fluctuations in standard operating environments, water vapor can be absorbed by plastic scintillators. When the temperature is reduced, the absorbed water can condense and form scattering centers in the plastic (i.e., fogging). That fogging reduces the overall light collection efficiency. After warming the plastic, such as during a normal temperature fluctuation, the fogging may or may not disappear entirely.

As noted above, conventional plastic scintillation radiation detector compositions typically employ a bulk plastic comprising polystyrene or polyvinyl toluene doped with appropriate fluor(s). However, such formulations must be protected against exposure to environmental conditions such as high humidity, cold temperatures, extreme temperature swings, or combinations thereof because these conditions cause the scintillator plastic to form bulk defects via fogging. These defects cause undesirable scattering of light incident upon and/or propagating through the optic, resulting in degradation of the optic performance (e.g., detection sensitivity).

Various environmental conditions have, previous to the inventive discovery presented herein, been known to cause formation of surface and/or bulk defects in a plastic scintillator optic comprising either polystyrene, polyvinyl toluene, or related polymers as would be appreciated by a person having ordinary skill in the art upon reading these descriptions.

For instance, in accordance with various illustrative aspects of the invention, exposing the scintillator to environmental conditions may include: (1) exposing the scintillator to a rapid change in temperature, e.g., a change of about 20° C. or more in a period of about 24 hours together with previous prolonged exposure to high humidity at about or greater than 30° C. (and greater than about 70% humidity); and/or (2) exposing the scintillator to approximately freezing temperatures for a period of several hours (e.g., 3-5 hours) or more.

Exposure of conventional plastic scintillators is a process that may occur over a period of several months or years in the environment; however, defects arising from fogging may appear following exposure of the scintillator to appropriate environmental conditions for a duration of only several hours or less.

The process of fogging in a plastic scintillator starts when the plastic is exposed to high humidity, the plastic absorbs water into the plastic. The water may become trapped and remain dissolved within the structure of the plastic. The plastic scintillator having some absorbed water is capable of scintillating light, but over time, and as the temperature decreases, the water condenses into droplets that the plastic scintillator exhibits as fog. Over time, with increasing accumulation and growth of water droplets, the water forms scattering centers in the plastic thereby causing the scintillator to have reduced light collection efficiency. Increasing the temperature does not clear the fog, so the water remains as a fogging artifact in the plastic.

Over time and exposure to humidity and fluctuating temperature, fogging in the plastic scintillator continues, the water droplets continue to accumulate, and/or the water droplets grow in size. Water tends to aggregate, and with the pressure of the surrounding plastic, in some cases, the water aggregates initiate cracks in the plastic resulting in optical defects causing increased optical scatter in the plastic scintillator.

In some cases, after initial fogging, the water in the plastic may redissolve and the fogging dissipates over time allowing the plastic scintillator to become optically transparent. However, continued exposure to humidity and fluctuating temperatures cause the water droplets in the plastic to grow to a size that causes cracks and visible permanent defects in the plastic.

The precise kinetics of the fogging processes leading to defect formation are not well understood at this time, however, according to various approaches described herein the rate of defect formation may be substantially improved by creating a plastic scintillator having resistance to formation of fog and bulk defects under environmental conditions, regardless of duration of conditions, temperature, humidity, etc. Put another way, the scintillating plastics described herein are structurally characterized by having a substantial absence of bulk defects leading to fogging following exposure of the scintillating plastic. Various conditions of exposure of the plastic scintillator may include one or more of a predetermined amount of time, humidity, temperature fluctuations, etc. Characterization of the structure of the plastic scintillators, including analysis of the presence or absence of structural defects may be assessed using any suitable device or technology available and known to skilled artisans, ranging in complexity from simple optical inspection to high-resolution imaging such as scanning electron microscopy.

For instance, according to preferred aspects of the invention, plastic scintillator compositions are substantially stable against formation of bulk defects within a temperature range of about −40° C. to about 55° C. or higher and a corresponding relative humidity in a range from about 0 to 100%. Accordingly, in preferred approaches, after exposing the scintillating plastic to the one or more extreme environmental conditions, the initial state (i.e., pre-exposure) of the scintillating plastic is unchanged. The detection efficiency of the plastic scintillator is unchanged following exposure of the plastic scintillator to various changing environmental conditions.

In certain applications, radiation detectors are operated outdoors in ambient weather condition. In some applications, radiation detectors may be exposed to extreme environmental conditions.

Since the primary factor in longevity of scintillation radiation detectors is the quality of the scintillator optic, radiation detectors should operate at peak efficiency for as long as possible to minimize the expense associated with monitoring and scintillator replacement. Accordingly, there is a need for techniques and associated systems configured to detect radiation of interest under various environmental conditions over a long period of time (e.g., several years, and ideally several decades), without degradation of the detector performance via fogging.

Figure 1B:
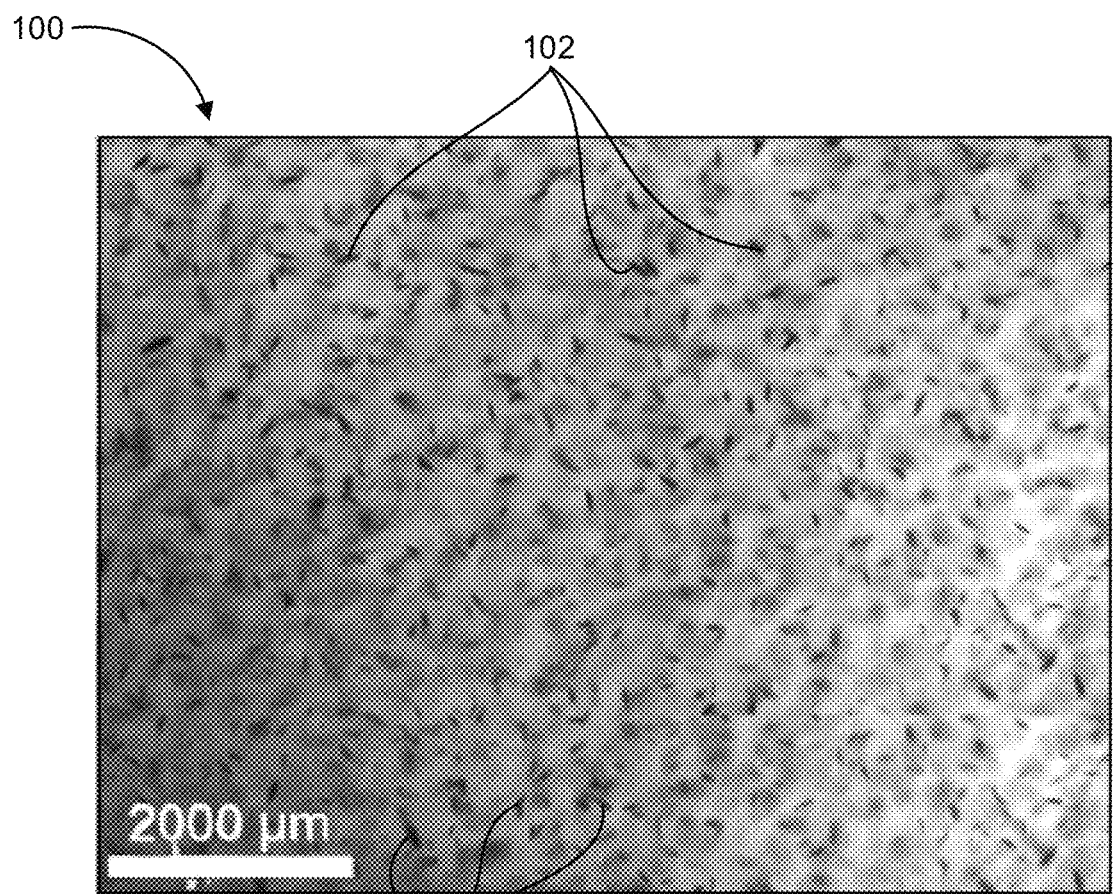
FIG. 1B is a magnified photographic image of a portion, shown by Detail A in FIG. 1A, of the conventional plastic scintillator of FIG. 1A after a first cooling cycle during thermal treatment in a humid atmosphere.

Referring to FIGS. 1A-1D commercial plastic scintillators are illustrated having defects after the plastic scintillators were subjected to thermal treatment in a humid atmosphere. An example of a standard plastic scintillator 100 is shown in FIGS. 1A and 1B after subjecting the scintillator 100 to a first cooling cycle. In one example, the standard plastic scintillator is a polyvinyl toluene (PVT)-based plastic scintillator. As shown in FIG. 1A the scintillator 100 has a foggy appearance. A magnified image of a portion of scintillator 100, shown in FIG. 1B, illustrates that thermal cycling can result in a plurality of defects 102 being present in the volume of the plastic that forms the scintillator 100. As illustrated, the defects 102 can have a variety of sizes, shapes and orientations throughout scintillator 100.

Defects due to fogging are present in the bulk volume of the material. As described herein, fogging of the bulk of the plastic scintillator is present when a water phase forms from aggregates of water droplets during prolonged exposure of the plastic material to humidity and fluctuating temperatures. The phase separation of water and polymer causes increased scattering of light in the scintillator material and thus the material appears opaque, fogged, etc. Moreover, the potential phase separation of the plastic and the water phases may lead to permanent defects in the plastic caused by the interaction of the phases, e.g., cracking of the plastic due to the increased volume of the water phase.

Figure 1C:
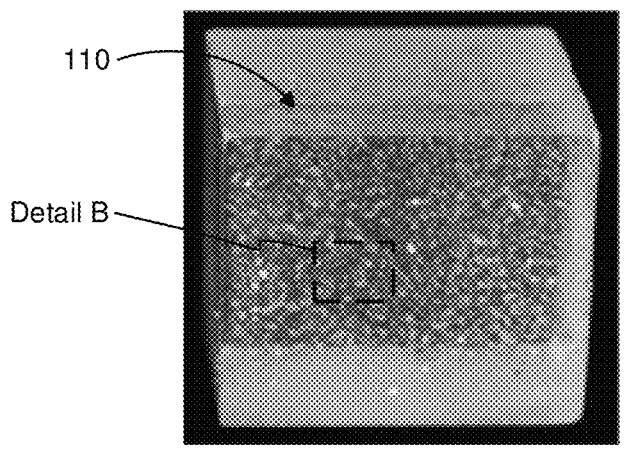
FIG. 1C is a photographic image of an exemplary conventional plastic scintillator after multiple heating and cooling cycles during thermal treatment in a humid atmosphere.
Figure 1D:
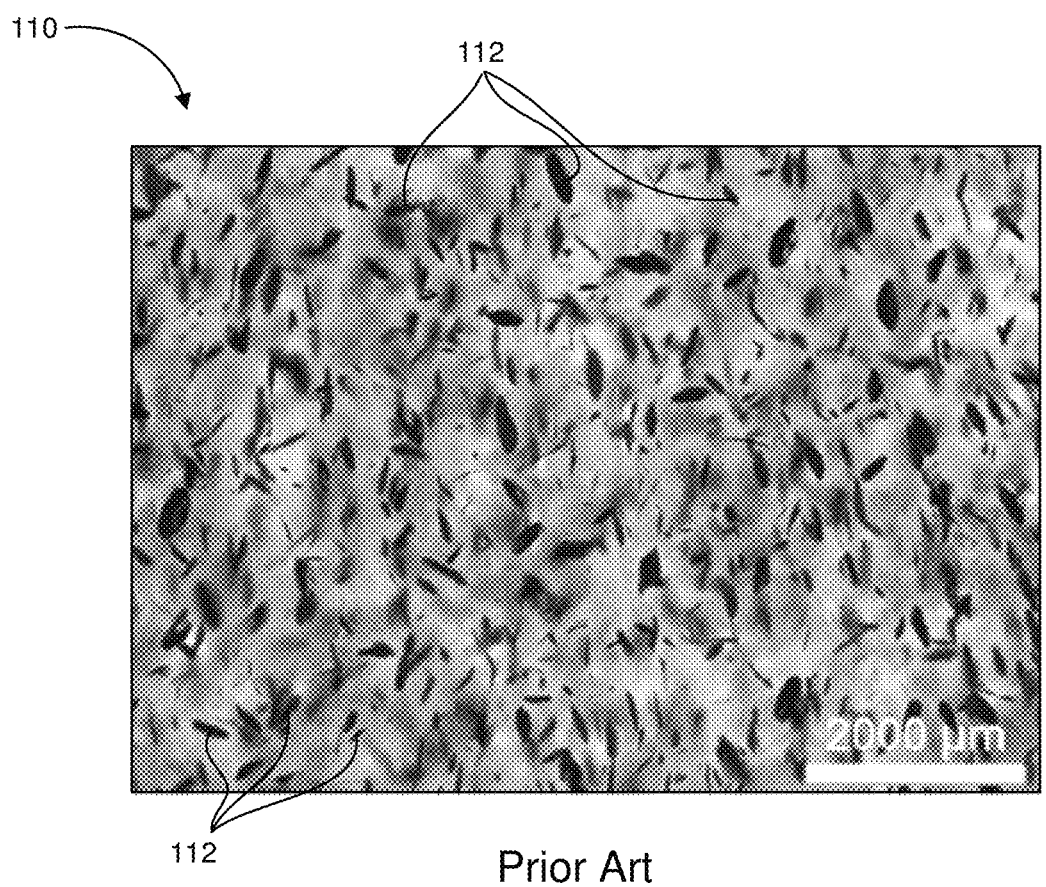
FIG. 1D is a magnified photographic image of a portion, shown by Detail B in FIG. 1C, of the conventional plastic scintillator of FIG. 1C after multiple heating and cooling cycles during thermal treatment in a humid atmosphere.

After thermal cycling through normal environmental temperature variations, the fogging defects may grow larger and may become permanent defects that do not disappear under typical operating conditions. Those defects can permanently reduce the light collection and detection efficiency of the scintillator. Scintillator 110, shown in FIGS. 1C and 1D, is constructed to be the same size and from the same material composition as scintillator 100, but scintillator 110 is shown after being subjected to multiple thermal cycles. Scintillator 110 includes a plurality of defects 112 that are generally larger than the defects 102 of scintillator 100. The defects 112 of scintillator 110 are large enough that they are visible as dots, or specks, in the body of scintillator 110. Defects 112 can have a variety of sizes, shapes, and orientations throughout scintillator 110, but they are generally larger than defects 102 of scintillator 100.

Figure 2:
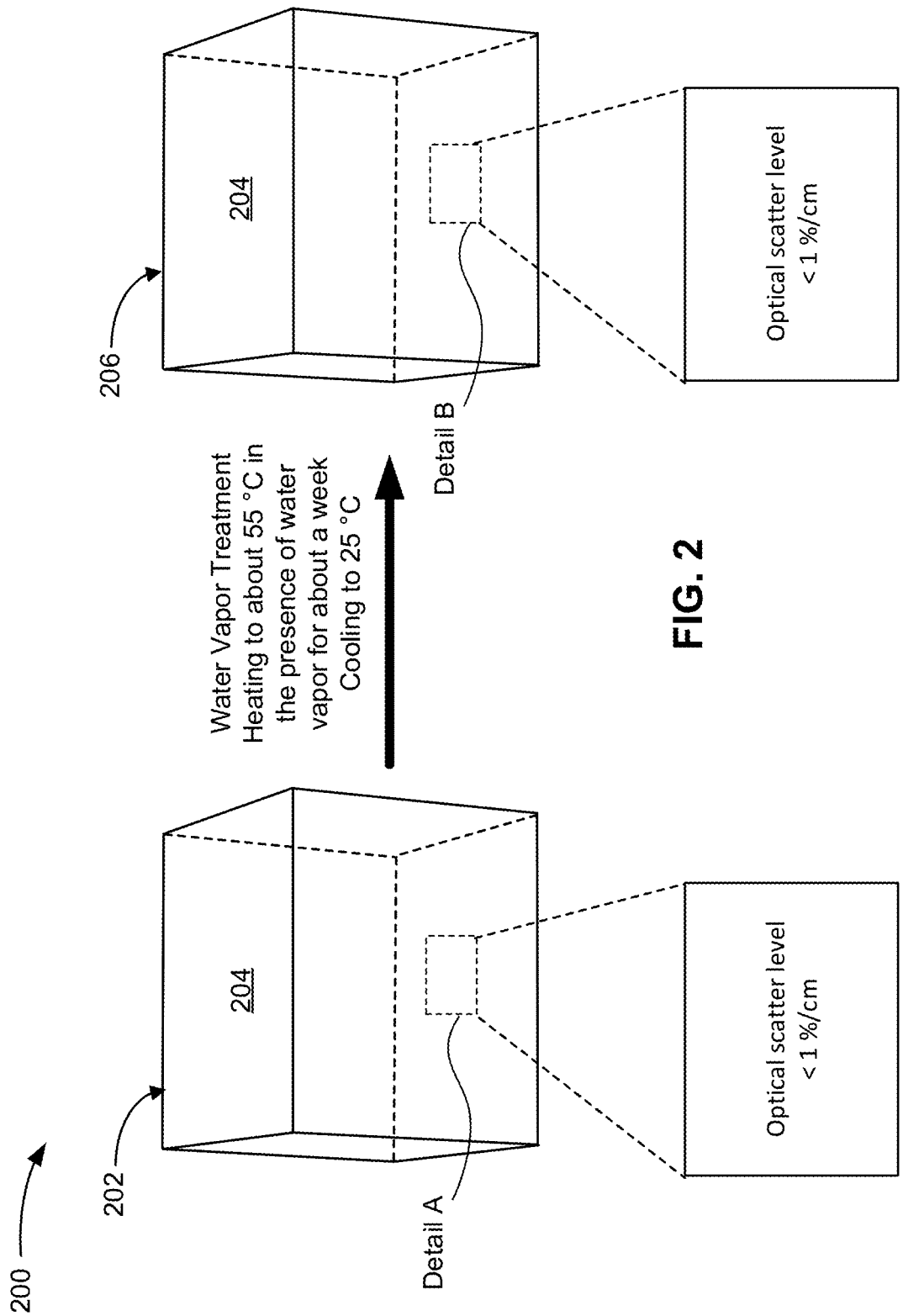
FIG. 2 is a schematic drawing of a plastic scintillator before and after a water vapor treatment, according to one aspect of the invention.

FIG. 2 depicts a schematic diagram of a perspective view of a plastic scintillator 202 before and after a water vapor treatment 200, in accordance with one aspect of the invention. As an option, the present plastic scintillator 202 may be implemented in conjunction with features from any other inventive concept listed herein, such as those described with reference to the other FIGS. Of course, however, such a plastic scintillator 202 and others presented herein may be used in various applications and/or in permutations which may or may not be specifically described in the illustrative embodiments listed herein. Further, the plastic scintillator 202 presented herein may be used in any desired environment.

According to an aspect of the invention, a plastic scintillator 202 is comprised of a polymer matrix 204, at least one aliphatic additive present in the polymer matrix 204 in an effective amount to impart fog resistance to the plastic scintillator 202, and at least one fluorescent dye in the polymer matrix 204, the dye being effective to provide scintillation upon exposure to radiation. For the purposes of this disclosure, the fog resistance may be defined as the plastic scintillator being essentially free of fog following a water vapor treatment comprising a heating of the plastic scintillator to about 55° C. in the presence of water vapor in a range of about 70% up to 100% relative humidity for one week followed by cooling the plastic scintillator to 25° C. In various approaches, the plastic scintillator may be cooled after heating to any temperature beow 60° C., for example, in a range of 60° C. to −40° C.

In one approach, as pertains to real-world ambient outdoor conditions, fog resistance may be defined as the plastic scintillator being essentially free of fog following a water vapor treatment that includes heating the plastic scintillator to 40° C. in the presence of water vapor in a range of about 70 to 100% relative humidity for one week followed by cooling the plastic scintillator to 0° C.

At 100% relative humidity, a conventional plastic scintillator heated to 60° C. will become saturated and subsequently fog after cooling the saturated plastic scintillator by 5 to 10° C., (i.e., to 55-50° C.). Moreover, cooling the saturated conventional plastic scintillator to 35° C. will cause the plastic scintillator to become fully opaque. Thus, depending on the saturation temperature, e.g., heating temperature, at 100% relative humidity, a conventional plastic scintillator will fog after only 10 to 15 degrees of cooling.

Surprisingly, by including an aliphatic additive in the plastic scintillator, the scintillator material became resistant to fogging under these same conditions. As described herein, the plastic scintillators having an aliphatic additive may be saturated at 100% relative humidity at any reasonable temperature of use (e.g., typically not higher than 60° C., but may be higher) and subsequently the saturated scintillator demonstrates no fogging when the saturated scintillator is cooled to any temperature below the saturation temperature. In some approaches, cooling the saturated plastic scintillator to minus 20° C. (−20° C.) may not produce fogging in the saturated plastic scintillator. In one approach, cooling the saturated plastic scintillator to −40° C. may not produce fogging in the saturated plastic scintillator.

For example, as illustrated in FIG. 2, a plastic scintillator 202 may be exposed to water vapor having a water vapor treatment (arrow) where the plastic scintillator is heated to about 55° C. or greater in the presence of water vapor for about one or more weeks, followed by cooling to 25° C. In preferred approaches, the optical transparency of the plastic scintillator following water vapor treatment 206 is unchanged from the plastic scintillator 202 before water vapor treatment, e.g., the water vapor treatment does not produce fogging in the plastic scintillator. A magnified view Detail A of the plastic scintillator 202 before water vapor treatment measures an optical scatter level less than 1%/cm, and a magnified view Detail B of the plastic scintillator after water vapor treatment 206 also measures an optical scatter level of less than 1%/cm.

Various techniques may be employed to determine whether a scintillator is essentially free of fog, for example, inspection for defects by microscopy, as shown in FIGS. 1A-1D, measurement of optical scatter of the scintillator. Optical scatter of the plastic scintillator is measured relative to a light beam. For example, an optical scatter level of 1%/1 cm results from a light, e.g., a laser beam, being directed in a straight line through the plastic, where for each centimeter of light travel, 1% of the light scatters in all directions, and 99% of the light continues to travel forward.

In preferred approaches, the plastic scintillator having an aliphatic additive maintains an optical scatter level of 1%/cm for a duration of greater than 5 years of use in an outdoor environment. In preferred approaches, the plastic scintillator having an aliphatic additive maintains an optical scatter level of 1%/cm for a duration of greater than 10 years of use. In an exemplary approach, the plastic scintillator having an aliphatic additive maintains an optical scatter level of 1%/cm for a duration of greater than 15 years of use.

In one approach, the plastic scintillator comprises a polymer at a level of more than about 50 wt. % relative to the total weight of the plastic scintillator. The polymer may include polyvinyltoluene (PVT), polystyrene (PS), related polymers, etc. In preferred approaches, the polymer is formed from at least one monomeric species having at least one phenyl group per monomeric unit for polymerization. The monomeric species may include one of the following: vinyltoluene, styrene, derivatives thereof, methylstyrene, dimethylstyrene, trimethylstyrene, etc. In one approach, the polymer comprises two or more of the monomeric species described herein.

In exemplary approaches, the plastic scintillator includes an aliphatic additive, non-aromatic hydrocarbon compound, etc. that may be defined as an organic compound in which the carbon atoms form open chains and do not form aromatic rings. In an aspect of the invention, the aliphatic oxygen-bearing compound may not participate in polymerization of the polymer forming the polymer matrix of the scintillator. Each aliphatic additive is incorporated into the polymer matrix of the scintillator. The incorporation of each aliphatic oxygen-bearing compound produces non-fogging plastic scintillators.

In an aspect of the invention, the polymer matrix of a plastic scintillator may include one or more aliphatic additives. The one or more aliphatic additives are present in the scintillator polymer, between the polymer molecules, but the structures of the aliphatic additives may not participate in the organization of the polymerized polymer matrix. The structures of the aliphatic additive, where smaller polymers sometimes referred to as oligomers, are likely present in between the chains of the polymer matrix. The aliphatic additive molecules reside within the polymer such that the water absorbed into the polymer matrix resides with the aliphatic additive, e.g., by forming bonds with the oxygen and/or nitrogen atoms of the aliphatic additive, thus the absorbed water is prevented from aggregating together to form water droplets. Said another way, the aliphatic additive promotes the absorbed water to remain in a molecular state bound to the aliphatic additive rather than an aggerate of water molecules.

In preferred approaches, a total amount of aliphatic additive may be present in the polymer matrix in an effective amount in a range of greater than 0 wt. % up to about 5 wt. % relative to the total weight of the plastic scintillator. In one approach, each aliphatic additive may be referred to as a molecule, oligomer, or small polymeric species, etc. An oligomer is a molecule typically understood to be a low molecular weight (less than about 900 Da) organic compound having a diameter in the nanometer range. In one approach, each aliphatic additive has a polymeric structure that includes up to 300 repeat units. In another approach, each aliphatic additive has a polymeric structure that includes less than or about 100 repeat units. In preferred approaches, each molecule of the aliphatic additive is a small polymeric structure having about 10 to 12 units.

In some approaches, the aliphatic additive in the plastic scintillator may include more than one type of aliphatic additive. In one approach, the aliphatic additive may not significantly impact the polymerization rate of the plastic scintillator. Moreover, each aliphatic additive may not lead to phase separation resulting in optical scattering upon polymerization.

As described herein, in one aspect of the invention, a plastic scintillator includes an aliphatic additive present in the polymer matrix in an effective amount to impart a fog resistance. One skilled in the art, now armed with the teachings presented herein, would be able to determine the proper effective amount of aliphatic additive via routine experimentation.

In one approach, the plastic scintillator does not evidence an optical scatter level of more than about 1%/cm after polymerization and before exposure to humidity in a range of 20 to 100%. In one example, the plastic scintillator has an optical scatter level less than about 1%/cm following a water vapor treatment of the plastic scintillator including exposure to relative humidity in a range of about 70 to 100% to about 55° C. and cooling to any temperature in the range of 55° C. to −40° C. In addition, the potential phase-separation of the aliphatic additive or any other component of the scintillator is not visually observable and/or shows an optical scatter level of less than 1%/cm.

In one approach, the structure of the aliphatic additive includes oxygen atoms and/or nitrogen atoms. In preferred approaches, each repeating unit of the aliphatic additive structure includes at least one of the following: an oxygen atom, a nitrogen atom, or a combination thereof. In preferred approaches, the structure of the one or more at least one aliphatic additive includes as many oxygen atoms as possible for binding with the water molecules and having optimal solubility with the polymer matrix to form an optically transparent plastic scintillator. The length of the aliphatic additive structure containing oxygen atoms and the concentration of the aliphatic additive may be tuned to form an optically transparent plastic scintillator.

For instance, in one approach the aliphatic additive is a homopolymer including at least one polyether repeat unit such as oxymethylene, ethylene glycol, propylene glycol, butylene glycol, or any derivative thereof.

In another approach, the aliphatic additive is a block copolymer comprising ethylene oxide and propylene oxide units, in which each unit is repeated one or more times in the block copolymer molecule. In one approach, the aliphatic additive is a block copolymer including ethylene oxide and butylene oxide units, where each unit is repeated at least one time in the molecule. In one approach, the aliphatic additive may be a surfactant. In one approach, one or more of the at least one aliphatic additive may be a poloxamer. In particular, a poloxamer may be a PLURONIC® (BASF Corporation, Florham Park, N.J.). The aliphatic additive may be one or more of the following series of nonionic surfactant commercial materials: SYNPERONIC® (Croda International, Princeton, N.J.), KOLLIPHOR® (BASF Corporation, Florham Park, N.J.), MAKON® (Stepan Company, Northfield, Ill.), etc.

In one approach, the PLURONIC® series includes a family of triblock copolymers of hydrophilic ethylene oxide (EO) and hydrophobic propylene oxide (PO) arranged in a general structure $EO_x$-$PO_y$-$EO_x$. In conventional applications, pluronics, poloxamers, etc. are generally known as foam suppressants, performing as dispersing agents and emulsifiers. Recently, pluronics have become an integral part of many recent medical applications, including treatment for cancer, anti-cancer drug carriers, particle size modulators, stabilising agents, cell thermosensitive agent, etc. In one approach, the aliphatic additive is Pluronic L31. In another approach, the additive is Pluronic L61. In another approach, the aliphatic additive is a material having a molecular structure closely related to Pluronic L31 and/or Pluronic L61.

Figure 3A:
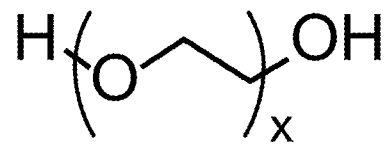
FIG. 3A depicts an exemplary aliphatic homopolymer additive containing oxygen-bearing repeat units, according to one aspect of the invention.
Figure 3B:
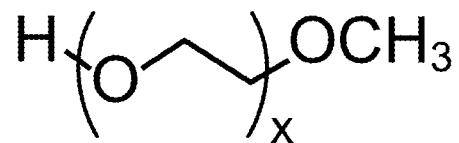
FIG. 3B depicts another exemplary aliphatic homopolymer additive containing oxygen-bearing repeat units, according to one aspect of the invention.
Figure 3C:
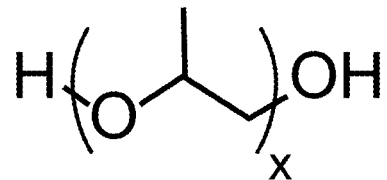
FIG. 3C depicts another exemplary aliphatic homopolymer additive containing oxygen-bearing repeat units, according to one aspect of the invention.

FIGS. 3A-3C illustrate schematic drawings of aliphatic homopolymer additives including oxygen-bearing repeat units that may be used to impart non-fogging behavior to plastic scintillators. In each of the schematics shown in FIGS. 3A-3C, the "x" is related to the number of repeat units of each molecule. In one approach, an oligomeric polymer may comprise less than or about 300 repeat units FIG. 3A illustrates a PEG-$(OH)_2$ structure and as indicated in the "Additive" column of Table 1, the number of repeat units x of the PEG in a PEG$(OH)_2$ structure results in a molecular weight (MW) of 500 (used in Entries 2, 12, and 13 in Table 1). FIG. 3B illustrates a PEG-(OMe)(OH) structure having the x repeat unit of PEG results in a MW 500 (as used in Entries 3-5, 12 and 13 in Table 1). FIG. 3C illustrates a PPG-$(OH)_2$ structure having the x repeat units of PPG resulting in a MW 1000 (as used in Entries 6-8 in Table 1).

Table 1 summarizes characteristics related to relative water uptake, relative light output, and fogging behavior for various polyvinyltoluene scintillators containing oxygen-bearing aliphatic additives and fluorescent dyes in accordance various embodiments. The water uptake was measured to verify that adequate water vapor was absorbed that would produce fogging in the absence of the exemplary aliphatic fog-resistant additive.

Figure 4:
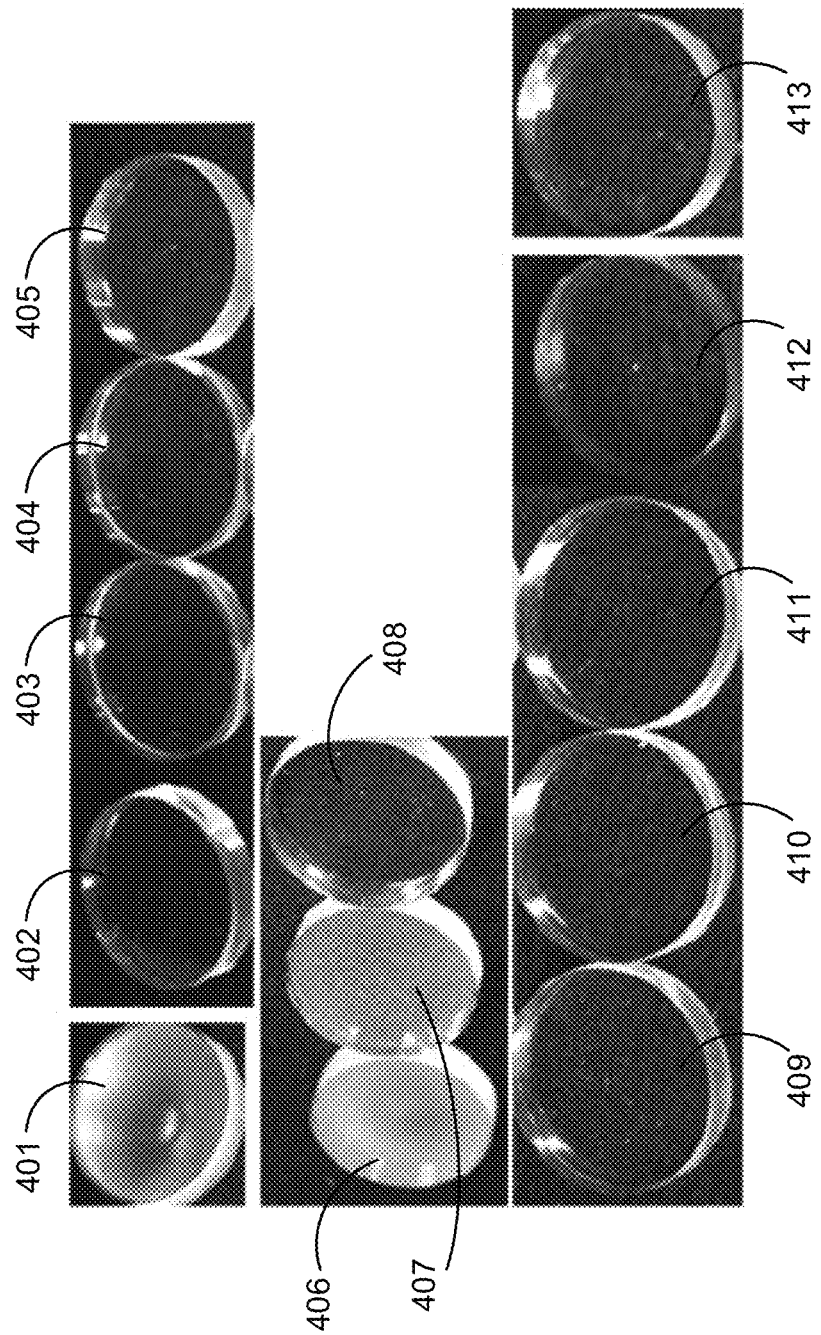
FIG. 4 includes photographic images of exemplary PVT-based plastic scintillators without and with aliphatic additives, according to various aspects of the invention.

FIG. 4 includes photographic images of the PVT scintillators described in Table 1. Each of the plastic scintillators described in Table 1 have dimensions of 1.0 inch diameter and 0.2 inch tall, as shown in FIG. 4. The images show the exemplary PVT scintillators after being subjected to a water vapor treatment as follows: 19 days of thermal cycling where each cycles included soaking at 55° C., 100% relative humidity (R.H.) after cooling to −20° C. This water vapor treatment of the plastic scintillators is by way of example only and is not meant to be limiting in any way.

As shown in FIG. 4, scintillators 401-405 correspond to entries 1-5 of Table 1, such that plastic scintillator without additive 401 has significant fogging (i.e., opaque, not optically transparent, etc.) after water vapor treatment and cooling. Plastic scintillator 402-405 having the aliphatic homopolymer additive as illustrated in FIG. 3B demonstrated variable fogging depending on the concentration of PEG-500-(OMe)(OH).

TABLE I

PVT-based scintillators containing oxygen-bearing aliphatic additives

| Entry | Additive[1] | Water Uptake (wt. %)[2] | Light Output[3] | Fogged?[4] |
|---|---|---|---|---|
| 1 | None | 0.061 | 1.08 | Yes |
| 2 | 1% PEG-500-$(OH)_2$ | 0.242 | 1.02 | No |
| 3 | 1% PEG-500-(OMe)(OH) | 0.137 | 1.13 | Yes |
| 4 | 2% PEG-500-(OMe)(OH) | 0.403 | 1.10 | No |
| 5 | 3% PEG-500-(OMe)(OH) | 0.694 | 1.06 | No |
| 6 | 1% PPG-1000-$(OH)_2$ | 0.086 | 1.02 | Yes |
| 7 | 2% PPG-1000-$(OH)_2$ | 0.100 | 1.08 | Yes |
| 8 | 3% PPG-1000-$(OH)_2$ | 0.117 | 1.10 | No |
| 9 | 1.5% Pluronic L31 | 0.100 | 1.09 | Yes |
| 10 | 2% Pluronic L31 | 0.134 | 1.10 | No |
| 11 | 2.5% Pluronic L31 | 0.183 | 1.08 | No |
| 12 | 0.5% PEG-500-$(OH)_2$, 0.5% PEG-500-(OMe)(OH) | 0.193 | 1.03 | No |
| 13 | 0.35% PEG-500-$(OH)_2$, 0.65% PEG-500-(OMe)(OH) | 0.203 | 1.04 | No |

[1]Number 500 or 1000 represent approximate molecular weight of additive
[2]Exposure to 100% relative humidty at 55° C. for 6 days
[3]Relative to size-matched EJ-200 scintillator produced by Eljen Technology (Sweetwater, TX), pre-aging
[4]Coded to −20° C. after heating in humidity at 55° C.

Plastic scintillators 406-408 having aliphatic homopolymer additive as illustrated in FIG. 3C also demonstrated variable fogging depending on the concentration of PPG-1000-$(OH)_2$.

Plastic scintillators 412 and 413 include a combination of aliphatic homopolymers as listed in Entry 12 and 13, respectively, in Table 1. Each demonstrated a fogging resistance to the water vapor treatment.

Figure 5A:
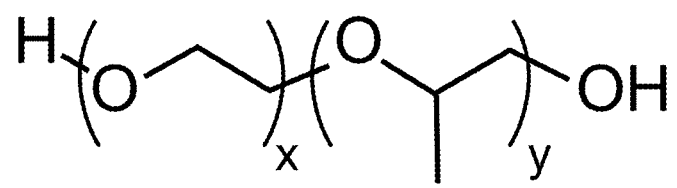
FIG. 5A depicts an exemplary aliphatic block copolymer additive containing oxygen-bearing repeat units, according to one aspect of the invention.
Figure 5B:
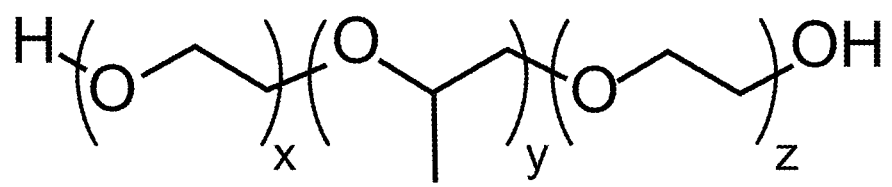
FIG. 5B depicts another exemplary aliphatic block copolymer additive containing oxygen-bearing repeat units, according to one aspect of the invention.

FIGS. 5A-5B illustrate schematic drawings of block copolymer aliphatic additives containing oxygen-bearing repeat units that can be used for constructing non-fogging plastic scintillators. As shown in FIG. 5A, a block copolymer aliphatic additive includes oxygen-bearing repeat units for non-fogging scintillators, where the copolymer includes an ethylene glycol-unit having an "x" number of repeat units and a propylene glycol unit having a "y" number of units, and where x and y are greater than or equal to 1.

As shown in FIG. 5B, a block copolymer aliphatic additive includes oxygen bearing repeat units for non-fogging scintillators, where the block copolymer includes various Pluronic series polymers with the general structure illustrated where x, y, and z are greater than or equal to 1. The block copolymer of FIG. 5B includes a propylene glycol having a "y" number of units sandwiched between ethylene glycol units having an "x" and a "z" number of units per block copolymer molecule. In many circumstances, the repeat units of the Pluronic materials x=z but may not be necessary to achieve non-fogging behavior.

In one approach, the block copolymer may comprise less than or about 300 repeat units. In another approach, the block copolymer may comprise less than or about

TABLE 2

Different Pluronic additives in PVT-based scintillators

| Surfactant | Concentration (wt. %) | # PO (y) | # EO (x) | As-Prepared Plastic |
|---|---|---|---|---|
| L31 | 2% | 15 | 2 | Transparent |
| L61 | 2% | 31 | 5 | Transparent |
| L62 | 2% | 31 | 10 | Opaque |

TABLE 2-continued

Different Pluronic additives in PVT-based scintillators

| Surfactant | Concentration (wt. %) | # PO (y) | # EO (x) | As-Prepared Plastic |
|---|---|---|---|---|
| L44 | 2% | 21 | 18 | Opaque |
| L64 | 2% | 31 | 27 | Opaque |

100 repeat units, where $x+y+z \leq 100$; or $x=z \leq 50$ and $y \leq 50$; or $x \leq 50$, $y \leq 50$, or $z \leq 50$. In another approach, each additive does not significantly impact the polymerization rate of the plastic scintillator.

Looking back to Table 1, entries 9, 10, and 11 list properties of plastic scintillators formed with the block copolymer Pluronic L31. As illustrated in FIG. 4, plastic scintillators 409, 410, and 411 represent the entries 9, 10, 11, respectively. As indicated, concentrations of Pluronic L31 at 2% (entry 10, plastic scintillator 410 in FIG. 4) and 2.5% (entry 11, plastic scintillator 411 in FIG. 4) demonstrated fog resistance while having comparable levels of water uptake, while 409 is only lightly fogged having visible defects.

Figure 6:
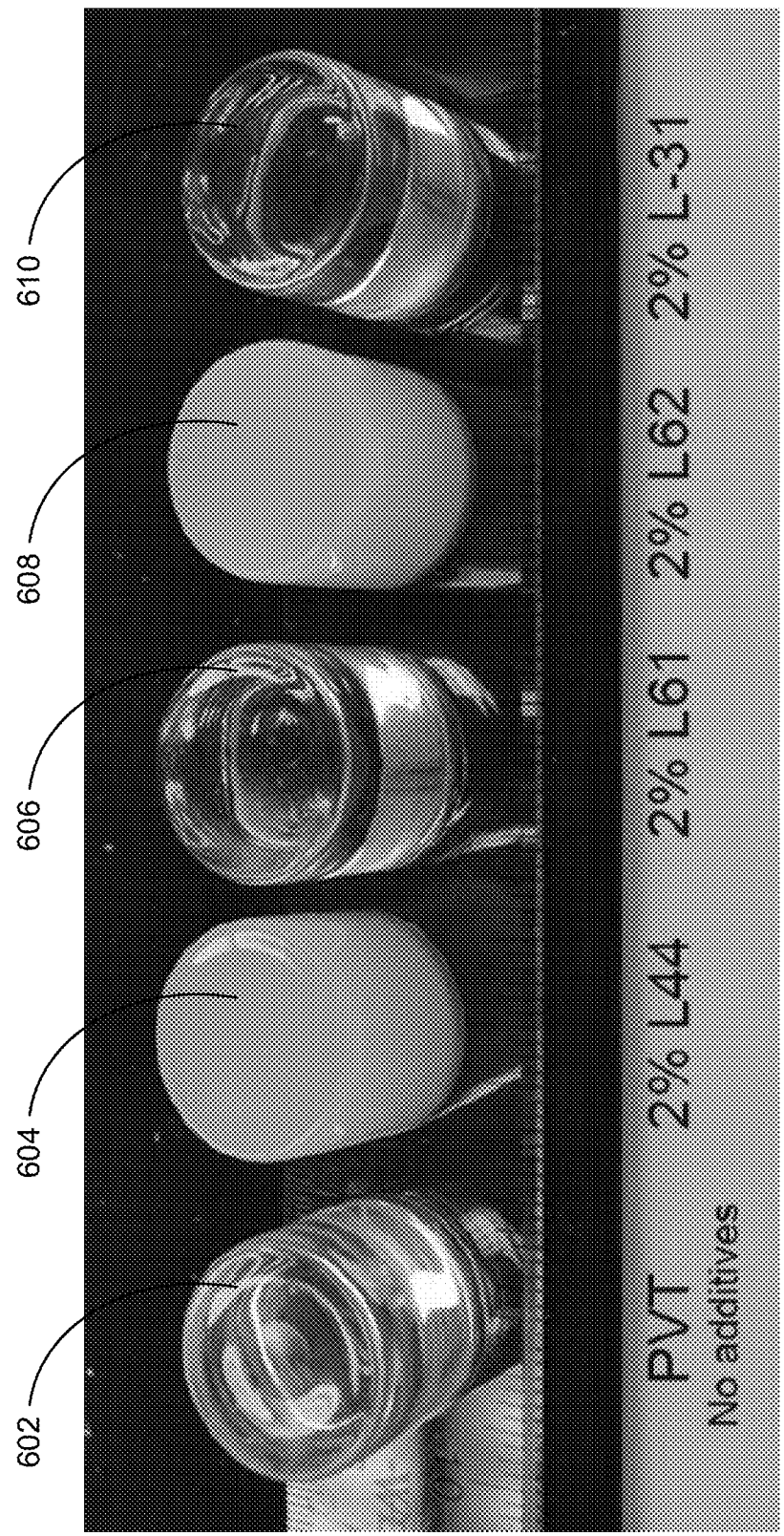
FIG. 6 is a photographic image of as-prepared PVT-based plastic scintillators without and with 2% Pluronics of different molecular weights and architecture, according to various aspects of the invention.

In various approaches, the molecular weight and architecture of a block copolymer molecule is important for producing an optically transparent, e.g., not opaque, plastic scintillator such that different architectures each Pluronic species may generate different light scattering patterns following polymerization. Table 2 and FIG. 6 illustrate a comparison of PVT-based plastic scintillators formed with block copolymer molecules having different block copolymers, e.g., Pluronic series, at the same concentration of 2% for each plastic scintillator. For each Pluronic species, the number of repeat units of propylene glycol (PO, y units) and ethylene glycol (EO, x, z units) are different as listed in Table 2 and represented in FIG. 6. Larger ethylene oxide units of the Pluronics series, as represented by plastic scintillators formed with Pluronics L44 (plastic scintillator 604 in FIG. 6), L62 (plastic scintillator 608 in FIG. 6), and L64, result in phase-separation before polymerization of the scintillator thereby causing optical scattering (e.g., opaque, not optically transparent, etc.) in the as-formed plastics. Pluronic block copolymers having fewer repeat units of ethylene oxide, such as in L31 and L61, tend to reduce, eliminate, prevent, etc. phase separation and produce transparent scintillators following polymerization, see plastic scintillator with L31 610 in FIG. 6, and plastic scintillator 606 in FIG. 6. The plastic scintillator without additive 602 has similar optical transparency compared to the plastic scintillators formed with L31 610 and L61 606 following polymerization.

Figure 7:
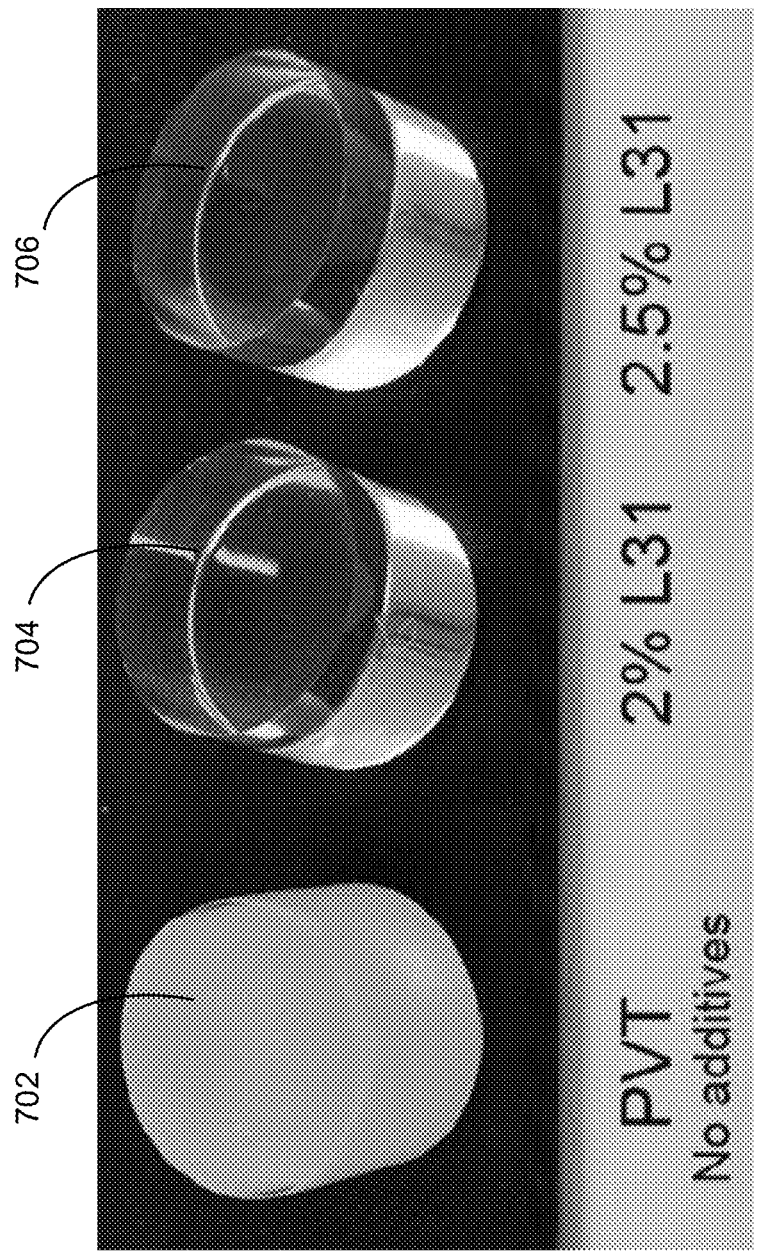
FIG. 7 is a photographic image of PVT-based plastic scintillators containing a Pluronic L31 additive after a water vapor treatment, according to various aspects of the invention.

In exemplary approaches, a plastic scintillator having an aliphatic block copolymer that does not generate an opaque plastic scintillator after polymerization, may tend to also exhibit fog resistance following a water vapor treatment. For example, as shown in FIG. 7, PVT-based plastic scintillators formed with the block copolymer Pluronic L31 at 2 wt. % concentration 704 and 2.5 wt. % concentration 706 are compared to a PVT plastic scintillator without additive 702. The image shows the PVT-based scintillators after subjecting plastic scintillators 702, 704, and 706 to a water vapor treatment of heating to 55° C. in 100% relative humidity followed by cooling to −20° C. The plastic scintillators 704, 706 containing the block copolymer aliphatic additive at the two different concentrations demonstrated fog resistance compared to the plastic scintillator without additive. These are by way of example only and are not meant to be limiting in any way.

In various other approaches, the plastic scintillator may include other additives such as organometallics, metal organics, secondary dyes, crosslinkers, and/or secondary polymers at a combined loading of less than about 50 wt. %.

In some aspects of the invention, the plastic scintillator may include molecular additives at effective concentrations and containing oxygen or nitrogen atom(s) within their structure. In one approach, a fluorescent dye such as PPO (p-terphenyl,2,5-diphenyl-1,3-oxazole), may render the plastic resistant to fogging. In some approaches, an effective concentration of PPO may be around 10 wt. %. The fluorescent dye PPO is advantageously both highly fluorescent as well as highly soluble in a primary polymer/polymeric matrix as described herein.

In one aspect of the invention, the fluorescent dye may include p-terphenyl, 2,5-diphenyl-1,3-oxazole (PPO), 2-([1,1'-biphenyl]-4-yl)-5-(4-(tert-butyl)phenyl)-1,3,4,oxadiazole (butyl-PBD), etc. In other approaches, various fluors or combinations of fluors may include the following: 7-diethylamino-4-methylcoumarin (MDAC), never before used in plastic scintillation radiation detector compositions. Other suitable fluors which may be utilized, such as the following: para-terphenyl, 2-(4-Biphenylyl)-5-phenyl-1,3,4-oxadiazole (PBD), 1,4-Bis(2-methylstyryl)benzene (Bis-MSB), 1,4-bis (5-phenyloxazol-2-yl) benzene (POPOP), and/or 9,10-diphenylanthracene (DPA). In various approaches, the fluorescent dye is present in the polymer matrix in an effective concentration to provide scintillation upon exposure to radiation. In some approaches, the fluorescent dye may be present in a concentration range of about 0.2 wt. % to about 6.0 wt. % and may be higher or lower.

In various approaches, the foregoing exemplary fluors may be utilized in any suitable combination, and suitable equivalently functioning fluor(s) that would be understood by a person having ordinary skill in the art after reading these descriptions may also be employed, all without departing from the scope of the instant disclosure.

In various aspects of an invention, the plastic scintillator may include a one or more of: additional polymers (e.g., secondary polymers), copolymers, monomers, crosslinkers, and/or certain molecular additives. In some approaches, a secondary polymer may be included with the primary polymers PVT and/or PS. In some approaches, secondary polymer may include divinylbenzene (DVB), polymethylmethacrylate (PMMA), or mixtures thereof.

Preferably, secondary polymers may be characterized by a molecular composition including oxygen. For instance, in one approach secondary polymers may include acrylic acid and/or derivatives thereof (e.g., methyl acrylate, ethyl acrylate, poly(propylene acrylate, etc.), methacrylic acid and/or derivatives thereof (methyl methacrylate (PMMA), ethyl methacrylate, poly(propylene glycol) methacrylate, etc.), and/or oxygen-bearing allyl analogs (e.g., allyl acetate, allyl ethyl ether, vinyl ether, etc.). Of course, other secondary polymer components that would be understood as equivalent to any of the foregoing by a person having ordinary skill in the art upon reading the present descriptions may also be employed without departing from the scope of the inventive concepts set forth herein.

Further still, and with particular reference to crosslinker secondary polymer components, DVB, ethylene glycol diacrylate or derivatives thereof, and/or ethylene glycol dimethacrylate or derivatives thereof, may be employed in accordance with several illustrative aspects of the invention.

In various approaches, the plastic scintillator may include combinations of aliphatic additive with acrylic acid and/or derivatives thereof, methacrylic acid and/or derivatives thereof, oxygen-bearing allyl analogs, ethylene diacrylate and/or derivatives thereof, ethylene glycol dimethacrylate and/or derivatives thereof, DVB, PMMA, and/or other secondary polymers as well as certain soluble molecular species (such as PPO) described herein. Preferably, either or both of the primary and secondary polymers, and various constituents thereof, are or include aromatic polymers. Without wishing to be bound to any particular theory, the inventors postulate that various additives having nitrogen and/or oxygen within their structure serve to hydrogen bond with the water infused during the periods of high humidity. In so doing, the O and/or N bonding to the water prevents the water from forming droplets in the plastic, e.g., the diffusion, exsolution of the water, etc. that leads to the formation of defects responsible for "fogging."

Figure 8:
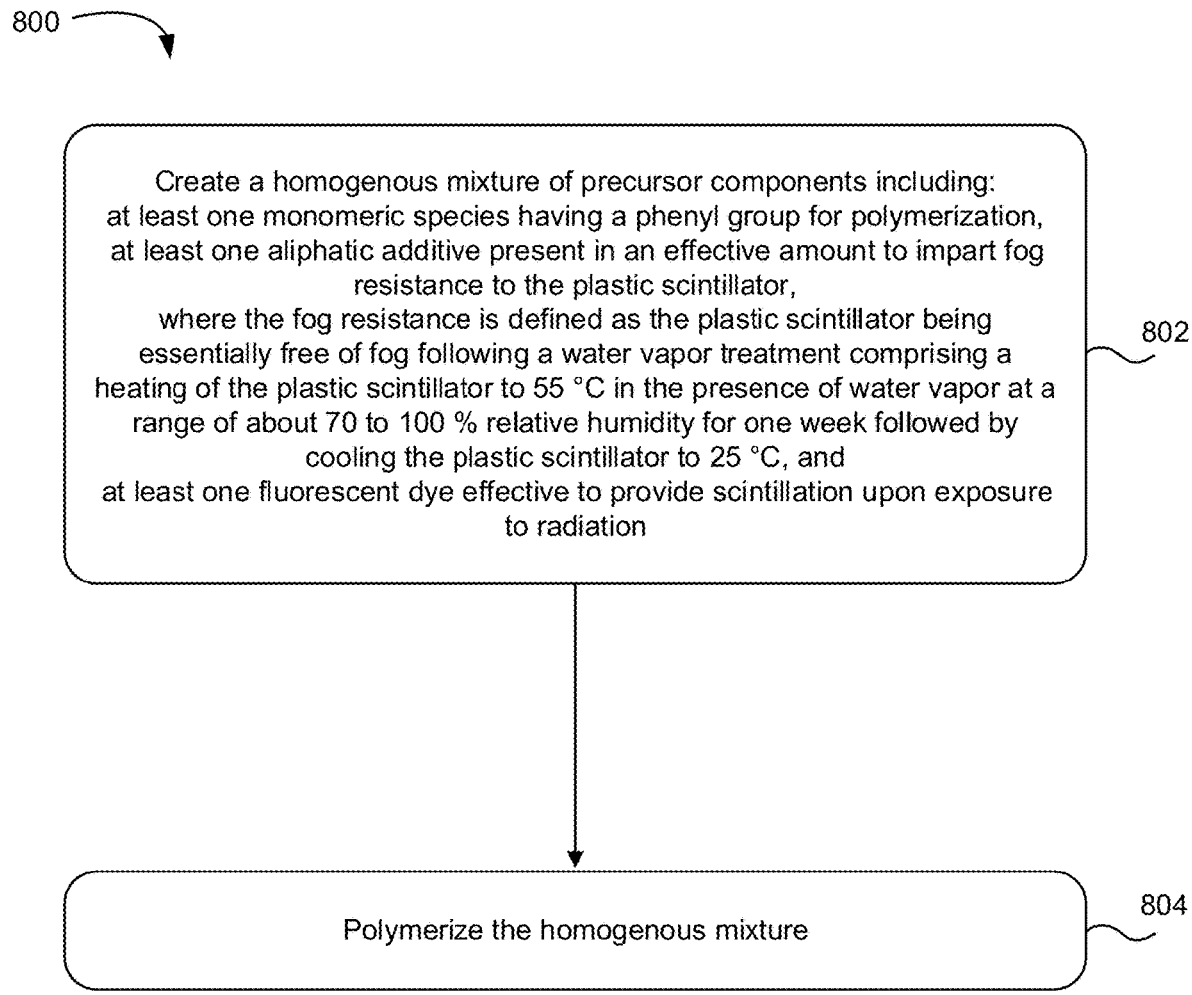
FIG. 8 is a flowchart of a method, according to one aspect of the invention.

Turning now to particular methods of fabricating plastic scintillators as described herein, FIG. 8 shows a method 800 of making a plastic scintillation radiation detector that is robust to fogging following exposure to environmental conditions including but not limited to water vapor and/or temperature variation. The method 800 as presented herein may be carried out in any desired environment that would be appreciated as suitable by a person having ordinary skill in the art upon reading the present disclosure. Moreover, more or less operations than those shown in FIG. 8 may be included in method 800, according to various embodiments. It should also be noted that any of the aforementioned features may be used in any of the embodiments described in accordance with the various methods.

As shown in FIG. 8, method 800 includes at least operation 802, where a homogenous mixture of precursor component is created. The precursor components include, at least one monomeric species having a phenyl group for polymerization, at least one aliphatic additive present in an effective amount to impart fog resistance to the plastic scintillator, and at least one fluorescent dye effective to provide scintillation upon exposure to radiation. As described more fully within this disclosure, the fog resistance may be defined as the plastic scintillator being essentially free of fog following a water vapor treatment comprising heating of the plastic scintillator to 55° C. in the presence of water vapor at a range of about 70 to 100% relative humidity for one week followed by cooling the plastic scintillator to any temperature in a range of 60° C. to −40° C. In one approach, the cooling of the saturated plastic scintillator may include lowering the temperature to 25° C.

The monomeric species, aliphatic additive(s), and fluor(s) may include any suitable species described herein, as well as equivalents thereof that would be appreciated by persons having ordinary skill in the art upon reading the instant disclosures.

Similarly, the various precursor materials may be obtained from commercial sources and used as-provided, particularly where the precursors are high-purity-grade materials.

Homogenization may be performed using any suitable technique and apparatus. However, in preferred approaches, the mixture is combined in an environment devoid of oxygen, e.g., an atmosphere of molecular nitrogen or argon, or under a vacuum, to avoid undesirable interaction of the precursors with oxygen.

In operation 804, method 800 continues with polymerization of the homogenous mixture. Polymerization may be accomplished in any suitable manner, optionally using an initiator. In approaches where the mixture of precursor materials includes a polymerization initiator, e.g., 1,1-Bis(t-butylperoxy)-3,3,5-trimethylcyclohexane (also known as LUPEROX 231(R)), the initiator is preferably present in an amount from about 0.01 wt % to about 1 wt % of the precursor materials.

In preferred approaches, polymerization includes incubating the homogenous mixture at a temperature of approximately 60° C. for a period of approximately 1 day; incubating the homogenous mixture at a temperature of approximately 65° C. for a period of approximately 1 day; and incubating the homogenous mixture at a temperature of approximately 70° C. for a period of approximately 4 days. More preferably, the precursor materials are incubated in a glass vessel or other suitable container and cooled to room temperature following polymerization. The final product may be obtained by breaking the glass vessel and extracting the polymerized optic.

However, as noted above, polymerization may be accomplished according to any suitable process that would be appreciated by a person having ordinary skill in the art upon reading the instant descriptions. The primary requirement is that the precursor mixture is fully polymerized following the process employed.

In exemplary approaches, the formed plastic scintillator has an optical scatter level of less than about 1%/cm. In preferred approaches, any potential phase separation of each aliphatic additive or any other component of the plastic scintillator is not visually observable.

Moreover, each aliphatic additive does not cause a phase separation before polymerization that would cause optical scattering in the plastic scintillator following polymerization of the homogenous mixture of precursor components. Following polymerization, the aliphatic additives are present in the polymer matrix but are not polymerized with the monomeric species. For example, the aliphatic additives may be embedded, crosslinked, etc. in the polymer matrix. In one approach, an aliphatic additive may not significantly affect (e.g., less than 50%) the rate of polymerizing the precursor components.

In one approach, a water vapor treatment may include exposing a plastic scintillator as described herein to one or more environmental conditions for a predetermined amount of time to determine whether fogging is produced in the scintillator plastic. As noted above, the precise amount of time and/or temperature and humidity levels for generating fogging may vary according to the size (and particularly the volume and surface area) of the plastic. In general, the greater the volume of the optic, and the lower the surface area, the longer the optic must be exposed to extreme conditions in order to "saturate" with defects.

In practice, the inventors have observed that defects may arise from fogging in a few hours, e.g., in the case of high-magnitude temperature swings (~100° C. change such as from 55° C. to −40° C.), or exposure to saturating water vapor at elevated temperature (e.g., about 50° C.), for conventional optics of similar shape and size. Without wishing to be bound to any particular theory, lower limits of exposure to extreme environmental conditions that cause fogging in conventional polyvinyl toluene-based and/or polystyrene-based optics have been observed under conditions including at room temperature and ambient humidity. The lower limit for the generation of as small amount of fogging can be observed in conventional plastics operating for few days in high humidity (>80%) with the temperature swings of ~30° C. (e.g., fast temperature decrease from 55° C. to RT, or from RT to −10° C.).

Regardless, in some cases, a detector comprising the plastic scintillator described herein may generate a signal strength in response to radiation from the source that may be unchanged following exposure to various environmental conditions, e.g., extreme conditions.

In Use

Various aspects of an invention described herein may be developed for detection of radioactive materials, illicit nuclear and radiological materials, identification of special nuclear materials, international safeguards, homeland security, radiation portal monitors, plastic scintillators for outdoor use, etc. In addition, aspects of the invention may benefit plastic optics for use in humid environments.

The inventive concepts disclosed herein have been presented by way of example to illustrate the myriad features thereof in a plurality of illustrative scenarios, aspects of an invention, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various aspects of the invention have been described above, it should be understood that they have been presented by way of example only, and not limitation. Thus, the breadth and scope of an aspect of the present invention should not be limited by any of the above-described exemplary aspects of the invention but should be defined only in accordance with the following claims and their equivalents.

What is claimed is:

1. A plastic scintillator, comprising:
a polymer matrix;
an aliphatic additive present in the aromatic polymer matrix in an effective amount to impart fog resistance to the plastic scintillator,
wherein the effective amount is in a range of greater than 0 weight percent up to 5 weight percent relative to the total weight of the plastic scintillator,
wherein the aliphatic additive is a block copolymer having a hydrophilic unit and a hydrophobic unit,
wherein the aliphatic additive has a structure comprising up to about 300 repeat subunits, the hydrophilic unit comprising repeat hydrophilic subunits and the hydrophobic unit comprising repeat hydrophobic subunits, wherein the hydrophilic subunit is an ethylene oxide subunit, and the hydrophobic subunit is selected from the group consisting of: a propylene oxide subunit and a butylene oxide subunit; and
at least one fluorescent dye in the aromatic polymer matrix, the dye being effective to provide scintillation upon exposure to radiation.

2. The plastic scintillator of claim 1, wherein the fog resistance is defined as the plastic scintillator being essentially free of fog following a water vapor treatment comprising a heating of the plastic scintillator to 55 degrees Celsius in the presence of water vapor in a range of about 70 to 100% relative humidity for one week followed by cooling the plastic scintillator to 25 degrees Celsius.

3. The plastic scintillator of claim 1, wherein the fog resistance is defined as the plastic scintillator being essentially free of fog following a water vapor treatment comprising a heating of the plastic scintillator up to 60 degrees Celsius in the presence of water vapor at about 100% relative humidity followed by cooling the plastic scintillator to minus 20 degrees Celsius (−20° C.).

4. The plastic scintillator of claim 1, wherein the fog resistance is defined as the plastic scintillator being essentially free of fog following a water vapor treatment comprising a heating of the plastic scintillator to 40 degrees Celsius in the presence of water vapor in a range of about 70 to 100% relative humidity for one week followed by cooling the plastic scintillator to 0 degrees Celsius.

5. The plastic scintillator of claim 1, wherein the structure of the aliphatic additive includes greater than 10 repeat subunits to less than 100 repeat subunits.

6. The plastic scintillator of claim 1, wherein the structure of the aliphatic additive comprises up to about 100 repeat subunits.

7. The plastic scintillator of claim 1, wherein the hydrophilic unit is at least two ethylene oxide subunits and the hydrophobic unit is at least two propylene oxide subunits.

8. The plastic scintillator of claim 1, wherein the block copolymer includes a second hydrophilic unit such that the hydrophobic unit is positioned between the hydrophilic unit and the second hydrophilic unit, the second hydrophilic unit comprising repeat hydrophilic subunits.

9. The plastic scintillator of claim 1, wherein the aliphatic additive is a poloxamer.

10. The plastic scintillator of claim 9, wherein the poloxamer is selected from the group consisting of: PLURONIC® L31, PLURONIC® L61, and a combination thereof.

11. The plastic scintillator of claim 1, the at least one fluorescent dye is selected from the group consisting of: p-terphenyl, 2,5-diphenyl-1,3-oxazole (PPO), 2-([1,1'-biphenyl]-4-yl)-5-(4-(tert-butyl)phenyl)-1,3,4-oxadiazole (butyl-PBD), and a combination thereof.

12. The plastic scintillator of claim 1, wherein the aromatic polymer matrix is formed from at least one monomeric species having at least one phenyl group per monomeric unit for polymerization, wherein the at least one monomeric species is selected from the group consisting of: vinyltoluene, styrene, and derivatives thereof.

13. The plastic scintillator of claim 1, further comprising at least one additive selected from the group consisting of: an organometallic, a metal organic, a secondary dye, a crosslinker, and a secondary polymer.

14. The plastic scintillator of claim 1, wherein the plastic scintillator is optically transparent, wherein the plastic scintillator has an optical scatter level less than about 1 percent per centimeter (%/cm) after polymerization.

15. The plastic scintillator of claim 1, wherein an optical scatter level of the plastic scintillator is less than 1 percent per centimeter (%/cm) following a water vapor treatment of the plastic scintillator.

16. A plastic scintillator, comprising:
a polymer matrix;
an aliphatic additive present in the aromatic polymer matrix in an effective amount to impart fog resistance to the plastic scintillator, wherein the fog resistance is defined as the plastic scintillator being essentially free of fog following a water vapor treatment comprising a heating of the plastic scintillator to 55 degrees Celsius in the presence of water vapor in a range of 70 to 100% relative humidity for one week followed by cooling the plastic scintillator to 25 degrees Celsius,
wherein the aliphatic additive is a poloxamer; and
at least one fluorescent dye in the aromatic polymer matrix, the dye being effective to provide scintillation upon exposure to radiation.

17. The plastic scintillator of claim 16, wherein the effective amount of the aliphatic additive is in a range of greater than 0 weight percent up to about 5 weight percent relative to the total weight of the plastic scintillator.

18. The plastic scintillator of claim 16, wherein the poloxamer has a structure comprising up to about 300 repeat subunits.

19. The plastic scintillator of claim 18, wherein the structure comprises up to about 100 repeat subunits.

20. The plastic scintillator of claim 16, wherein the fog resistance is defined as the plastic scintillator being essentially free of fog following a water vapor treatment comprising a heating of the plastic scintillator up to 60 degrees Celsius in the presence of water vapor at about 100% relative humidity followed by cooling the plastic scintillator to minus 20 degrees Celsius (−20° C.).

21. The plastic scintillator of claim 16, further comprising at least one additive selected from the group consisting of: an organometallic, a metal organic, a secondary dye, a crosslinker, and a secondary polymer.

22. A method of forming a plastic scintillator, the method comprising:
creating a homogenous mixture of precursor components including:
at least one monomeric species having a phenyl group for polymerization,
an aliphatic additive present in an effective amount to impart fog resistance to the plastic scintillator, wherein the fog resistance is defined as the plastic scintillator being essentially free of fog following a water vapor treatment comprising a heating of the plastic scintillator to 55 degrees Celsius in the presence of water vapor in a range of 70 to 100% relative humidity for one week followed by cooling the plastic scintillator to 25 degrees Celsius,
wherein the aliphatic additive is a poloxamer, and
at least one fluorescent dye effective to provide scintillation upon exposure to radiation; and
polymerizing the homogenous mixture.

23. The method of claim 22, wherein the formed plastic scintillator has an optical scatter level of less than about 1 percent per centimeter (%/cm).

24. The method of claim 22, wherein the aliphatic additive does not cause a phase separation before polymerization that would cause optical scattering in the plastic scintillator following polymerization.

* * * * *